United States Patent [19]

Lüchinger et al.

[11] 4,354,563
[45] Oct. 19, 1982

[54] ELECTROMAGNETIC WEIGHING APPARATUS HAVING MULTIPLE AIR GAPS

[75] Inventors: Paul Lüchinger, Uster; Andreas Stutz, Aathal, both of Switzerland

[73] Assignee: Mettler Instrumente AG, Greifensee, Switzerland

[21] Appl. No.: 253,275

[22] Filed: Apr. 13, 1981

[30] Foreign Application Priority Data

Jun. 6, 1980 [CH] Switzerland ............... 4368/80

[51] Int. Cl.³ .................. G01G 7/00; G01G 3/14
[52] U.S. Cl. ...................... 177/212; 177/210 EM
[58] Field of Search ................ 177/210 EM, 212

[56] References Cited

U.S. PATENT DOCUMENTS

| | | | |
|---|---|---|---|
| 3,092,197 | 6/1963 | Ecker | 177/212 X |
| 3,186,504 | 6/1965 | Van Wilgen | 177/212 X |
| 3,688,854 | 9/1972 | Strobel | 177/212 X |
| 3,786,883 | 1/1974 | Kunz | 177/212 X |
| 4,236,590 | 12/1980 | Knothe et al. | 177/212 X |

*Primary Examiner*—George H. Miller, Jr.
*Attorney, Agent, or Firm*—Laubscher, Philpitt & Laubscher

[57] ABSTRACT

This invention relates to weighing apparatus of the electromagnetic load compensation type including a load or compensation coil connected with the load receiving member, and a reference coil connected with the frame for movement independent of the load receiving member, characterized in that the load and reference coils are arranged within separate air gaps of the magnetic field produced by a permanent magnet system mounted on the weighing apparatus frame. In one embodiment, the permanent magnet system includes a permanent magnet having a rotationally symmetrical field, and a magnetic yoke arrangement including an annular outer pole shoe arranged in concentrically spaced relation about an inner pole shoe. An annular ferromagnetic member is arranged in concentrically spaced relation between the inner and outer pole shoes for defining the air gaps in which the reference and load coils are arranged, respectively. In a second embodiment, the permanent magnet system includes a yoke having an annular outer pole shoe arranged in concentrically spaced relation about an inner pole shoe, the permanent magnet system including an annular arrangement of permanent magnets arranged in concentric spaced relation between the inner and outer pole shoes.

7 Claims, 3 Drawing Figures

ELECTROMAGNETIC WEIGHING APPARATUS HAVING MULTIPLE AIR GAPS

BRIEF DESCRIPTION OF THE PRIOR ART

Weighing systems of the electromagnetic load compensation return-to-zero type are well known in the prior art, as evidenced, for example by the U.S. patents to Allenspach No. 3,786,884, Kunz Nos. 3,786,678 and 3,786,883, Strobel No. 3,688,854, Strobel et al Nos. 3,789,937, 3,986,571 and 4,090,575 and Kunz No. 4,062,417, (all held by the assignee of the present invention), among others, such as the U.S. patent to Baur No. 3,322,222.

Scales with electromagnetic force or load compensation, as we know, work in the following manner: connected with the scale cup or the load receiver (directly or indirectly) there is a coil which movably extends within the magnetic field of a permanent magnet system. Current flowing through the coil according to the known laws generates a force perpendicular to the direction of the magnetic field in the air gap. A regulating circuit determines the size of the current flowing through the coil so that the resultant electromagnetic force, acting upon the load receiver, is equal to the total loads (material to be weighed plus possible dead weight of load receiver) in the opposite direction (balance state). In this condition, the coil current is approximately proportional to the load and can be used for the indication of the weight.

This dependence of the current on the load, however, as we said before, applies only in an approximate fashion. It is subjected to certain disturbing influences which can make themselves noticed unpleasantly in case of higher requirements for weighing accuracy especially in the form of nonlinearities and sensitivity changes.

One essential source of these disturbing influences is based on the following phenomenon: the compensation current, flowing through the coil, builds up a magnetic field of its own which is proportional to the current and which is superposed on the permanent magnet field. Under ideal conditions, particularly regarding the position of the coil in the air gap, the force components of the superposed magnetic field can cancel each other out. Such ideal prerequisites, however, in most cases do not prevail. Even minor desirable and undesirable shifts in the coil create a situation where force components are left over from the magnetic field belonging to the coil. These components have an effect, depending upon their direction, in terms of an increased or reduced coil current and they thus in the end cause a falsification of the weight indication.

The disturbing influences described above have a particularly unpleasant effect in scales of the kind described initially wherein two coils are arranged in a common air gap, in other words, close to each other. Here, the effects described result not only from the particular coil current in each coil but they are also influenced by the size of the current going through the particular other coil. In addition to that we also have the fact that the stray field increases with the width of the air gap and that the homogeneity of the permanent magnet field thus decreases, something which likewise influences the disturbing effects.

It was the purpose of the present invention, in a scale of the kind mentioned in the beginning, to reduce the disturbances mentioned, in other words, especially to improve the linearity and to keep the sensitivity more constant.

SUMMARY OF THE INVENTION

Accordingly, a primary object of the present invention is to provide a weighing apparatus of the electromagnetic load compensation type wherein the air gap of the magnetic field is subdivided by means of an intermediate element into two air gap parts, one of which receives the load [charge] coil while the other one receives the reference coil. In this manner, the above-described mutual influencing among the two coils is extensively suppressed and the air gap parts must be dimensioned only for one coil, each.

In recent times, electromagnetically force-compensating scales have frequently been so designed that the permanent magnet system is constructed along the lines of rotation symmetry and that the two coils are arranged concentrically with respect to each other (as shown, for example, by the U.S. patents to Strobel No. 3,688,854 and Kunz No. 3,786,883). Applied to such scales, the invention at hand provides that the intermediate element be an intermediate ring so that the two air gap parts will be concentric with respect to each other.

In accordance with a preferred embodiment, the permanent magnet is arranged in the center of the permanent magnet system and the intermediate ring is formed of magnetically permeable material, the ring being connected with the permanent magnet system via at least one non-ferromagnetic support. Here, the magnetically permeable intermediate ring also exerts a homogenizing effect upon the permanent magnet field. By magnetically permeable is meant a material with a relative permeability of more than 2. It is, of course, understood here that the improvement attainable according to the invention will increase, the higher the relative permeability is; therefore, a ferromagnetic material (for example, soft iron) is preferred.

BRIEF DESCRIPTION OF THE DRAWING

Other objects and advantages of the invention will become apparent from a study of the following specification when viewed in the light of the accompanying drawings, in which.

DETAILED DESCRIPTION

Figure 1:
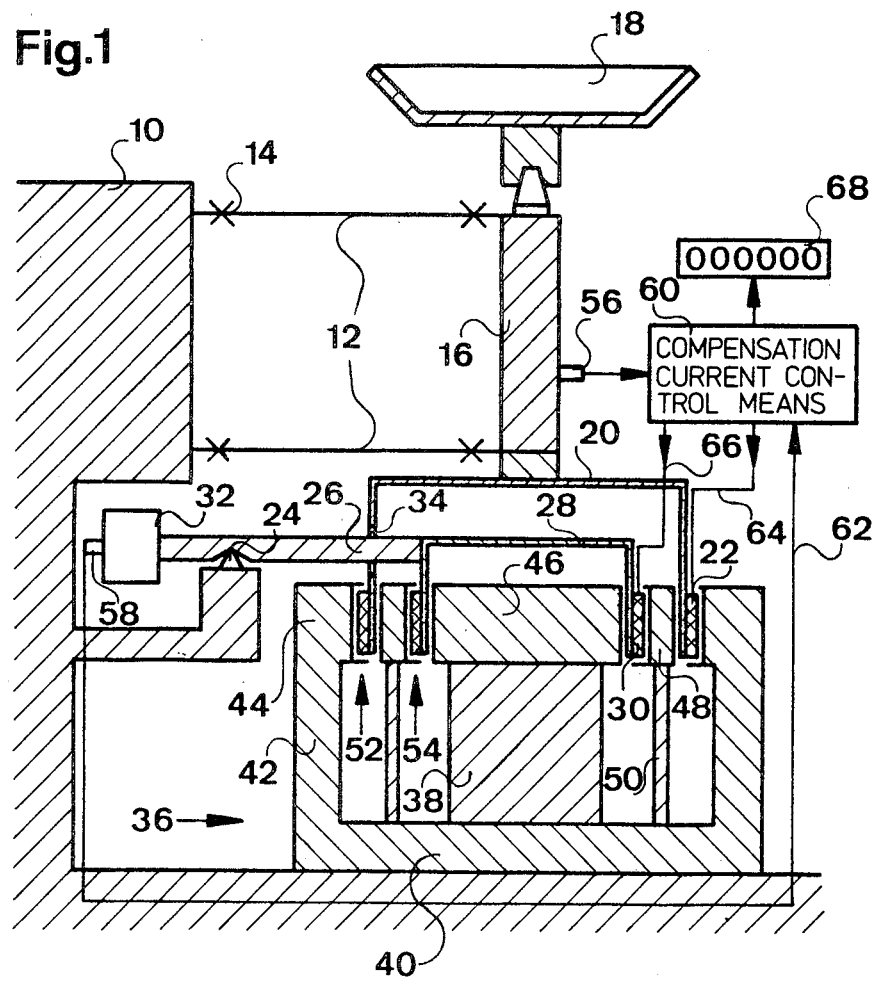
FIG. 1 is a somewhat diagrammatic vertical longitudinal sectional view of a first embodiment of the weighting apparatus of the present invention.

Referring first more particularly to FIG. 1, the weighing apparatus of the present invention includes a stationary frame 10 to which the load-receiving member 16 having at its upper end a weighing pan 18 is connected for vertical movement by the parallel linkage guide arms 12 and pivot points 14. Connected with the lower end of the load-receiving member 16 by the non-ferromagnetic cup-shaped coil carrier 20 is an annular load coil 22. Pivotally connected intermediate its ends with the frame for movement about stationary pivot 24 is a lever arm 26 that carries at one end a non-ferromagnetic cup-shaped coil carrier 28 arranged in spaced relation concentrically within the coil carrier 20. At its lower circumferential edge, the coil carrier 28 carries an annular reference coil 30 that is arranged in concentrically spaced relation with regard to the load coil 22. Lever arm 26 is provided at its other end with an adjustable counterweight member 32 for initially balancing the lever arm 26.

The apparatus further includes a magnetic field establishing system 36 for producing a constant magnetic field that is rotationally symmetrical about the vertical axis, which system includes a vertically arranged permanent magnet 38, and a soft iron yoke 40 including an annular jacket portion 42 arranged concentrically in spaced relation about the permanent magnet 38, and an annular outer pole shoe portion 44. Arranged in concentrically spaced relation within the outer pole shoe portion is an inner soft iron pole shoe 46 that is mounted on the upper end of the permanent magnet 38. In accordance with the present invention, an annular soft iron divider ring 48 is supported by support ring 50 (which is formed of a non-ferromagnetic material, such as brass) in concentric spaced relation between the inner and annular pole shoes 46 and 44, respectively, for defining a pair of annular air gaps 52 and 54 that receive the load and reference coils 22 and 30, respectively.

First stationary position sensing means 56 (such as a photoelectric cell/light source arrangement mounted on the frame 10) are provided for sensing displacement of the load-receiving member 16 from its initial no-load position when a mass to be weighed is applied to the weighing pan 18. Furthermore, second stationary position sensing means 58 (of the photoelectric type, for example) is mounted on the frame 10 adjacent the counterweight 32 for detecting displacement of the lever 26 from its normal balanced position. The load sensing means 56 sends a load input signal to one input terminal of the compensation current control circuit 60, and the reference sensing means 58 sends a reference signal to the other input of the control circuit 60 via conductor 62. The compensation current control circuit 60—which is of the type illustrated in the prior patents to Strobel No. 3,688,854 and Allenspach No. 3,786,884—processes the load and reference signals to supply load compensation current to load coil 22 via conductor 64, and reference compensating current to reference coil 30 via conductor 66. These compensating currents tend to restore the load and reference coils to their initial positions, respectively, whereupon a weight signal that is a function of the integral of the compensation currents is supplied to the weight indicating device 68 to present a visual indication of the magnitude of the mass applied to weighing pan 18.

Figure 2:
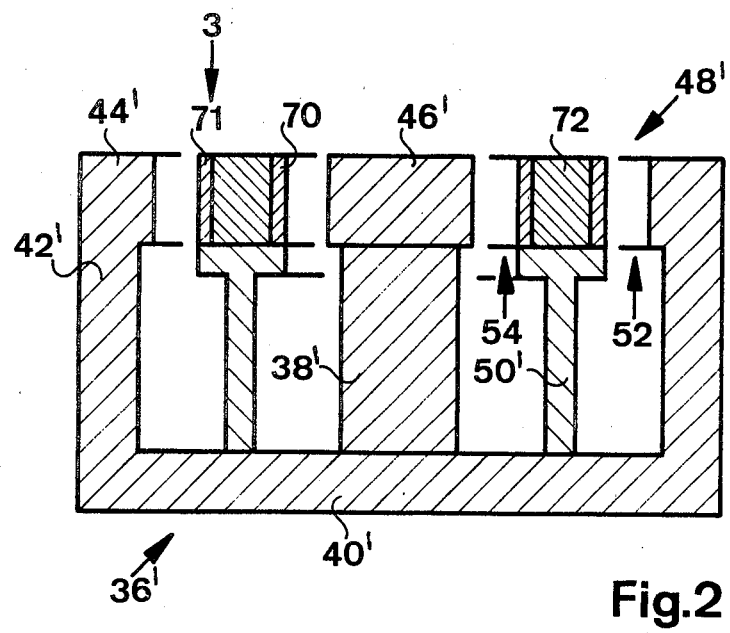
FIG. 2 is a sectional view of an alternate embodiment of the magnetic field system of FIG. 1.
Figure 3:
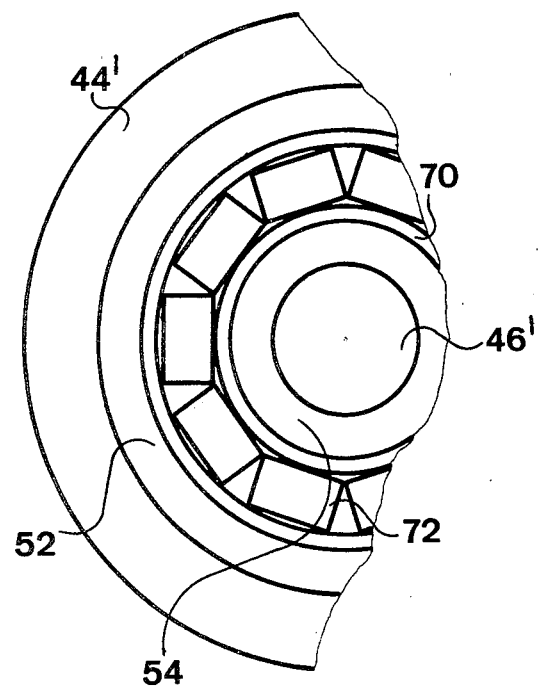
FIG. 3 is a detailed top plan view of the apparatus of FIG. 2.

In the modification of FIGS. 2 and 3, the permanent magnet system 36' includes a soft iron yoke 40' having an annular portion 42' that supports the soft iron annular outer pole shoe 44', and a soft iron central column portion 38' that supports inner soft iron pole shoe 46' in concentrically spaced relation within the annular outer pole shoe 44'. Non-ferromagnetic support ring 50' (formed of brass, for example) supports a circular array of parallel like permanent magents 72 concentrically in spaced relation between the inner and outer pole shoes, thereby to define a pair of annular air gaps 52 and 54 for receiving the load and reference coils, as described above with reference to FIG. 1. The magnets 72 are preferably secured, by a suitable adhesive, for example, between inner and outer soft iron annular jacket rings 70 and 71, respectively. The operation of this embodiment corresponds to that described above with reference to FIG. 1.

What is claimed is:

1. In a weighing apparatus of the electromagnetic load compensation return-to-zero type including a frame (10); a load-receiving member (16) movably connected with, and normally having an initial no-load position, with respect to, said frame; means (38, 72) connected with said frame for establishing a stationary constant magnetic field; load-mechanic means including a load coil (22), and first means (20) connecting said load coil with said load-receiving member for movement in said field; reference means including a reference coil (30), and second means (26) connecting said reference coil with said frame for movement from a normal reference position within said field; load signal generating means (56) for generating a load signal that is a function of the extent of displacement of said load-receiving member from its initial no-load position; reference signal generating means (58) for generating a reference signal that is a function of the displacement of the reference coil from its reference position; and control circuit means (60) responsive to said load and reference signals for supplying load and reference compensation currents (64, 66) to said load and reference coils to displace the same toward their initial no-load and reference positions, respectively, said control circuit means also producing as a function of said load and reference compensation currents a weight indicating signal that is a function of the load applied to said load-receiving member;

the improvement wherein said magnetic field establishing means includes divider means (48, 48') dividing said magnetic field into a pair of separate air gaps (52, 54), said load and said reference coils being arranged in said air gaps, respectively.

2. Apparatus as defined in claim 1, wherein said magnetic field establishing means produces a magnetic field that is rotationally symmetrical about a given axis; wherein said load and reference coils are annular and are concentrically arranged; and further wherein said divider means includes an annular divider member (48, 48') arranged to divide the magnetic field into said pair of air gaps in which said load and reference coils are arranged, respectively.

3. Apparatus as defined in claim 2, wherein said magnetic field establishing means includes a permanent magnet (38) coaxially arranged relative to said air gaps; and further wherein said divider member is formed of magnetically permeable material, said divider means including non-ferromagnetic support means (50) for supporting said divider member relative to said frame.

4. Apparatus as defined in claim 2, wherein said field establishing means includes ferromagnetic yoke means (36', 42') having an inner pole shoe (46') and an annular outer pole shoe (44') arranged concentrically in spaced relation about said inner pole shoe, and annular permanent magnet means (48') arranged in concentrically spaced relation between said inner and outer pole shoes, thereby to define a pair of air gaps (52, 54).

5. Apparatus as defined in claim 4, wherein said annular permanent magnet means includes a plurality of like permanent magnets (72) arranged in a circular pattern.

6. Apparatus as defined in claims 4 or 5, wherein said annular permanent magnet means includes at least one annular ferromagnetic jacket (70, 71) arranged concentrically relative to said permanent magnet means.

7. Apparatus as defined in claim 5, wherein said magnetic field establishing means includes yoke means (40, 42) having an inner pole shoe (46), and an annular outer pole shoe (44) arranged in concentrically spaced relation about said inner pole shoe, said annular divider member being arranged in concentrically spaced relation between said inner and outer pole shoes, thereby to define the annular air gaps in which said load and reference coils are mounted, respectively.

* * * * *